United States Patent
Fraas et al.

(10) Patent No.: US 6,489,553 B1
(45) Date of Patent: Dec. 3, 2002

(54) TPV CYLINDRICAL GENERATOR FOR HOME COGENERATION

(75) Inventors: Lewis M. Fraas, Issaquah, WA (US); John E. Samaras, Seattle, WA (US); Leonid M. Minkin, Seattle, WA (US)

(73) Assignee: JX Crystals Inc., Issaquah, WA (US)

( * ) Notice: Subject to any disclaimer, the term of this patent is extended or adjusted under 35 U.S.C. 154(b) by 0 days.

(21) Appl. No.: 09/866,649

(22) Filed: May 30, 2001

(51) Int. Cl.$^7$ .............................................. H01L 31/058

(52) U.S. Cl. ........................ 136/253; 136/246; 431/100; 431/115; 431/116

(58) Field of Search ................................. 136/253, 246; 431/100, 115, 116

(56) References Cited

U.S. PATENT DOCUMENTS

| | | |
|---|---|---|
| 3,433,676 A | 3/1969 | Stein |
| 3,751,303 A | 8/1973 | Kittl |
| 3,929,510 A | 12/1975 | Kittl |
| 4,017,758 A | 4/1977 | Ahlmer |
| 4,045,246 A | 8/1977 | Mlavsky et al. |
| 4,069,812 A | 1/1978 | O'Neill |
| 4,131,485 A | 12/1978 | Meinel et al. |
| 4,180,414 A | 12/1979 | Diamond et al. |
| 4,234,352 A | 11/1980 | Swanson |
| 4,331,829 A | 5/1982 | Palazzetti et al. |
| 4,707,560 A | 11/1987 | Hottel et al. |
| 4,746,370 A | 5/1988 | Woolf |
| 4,776,895 A | 10/1988 | Goldstein |

(List continued on next page.)

FOREIGN PATENT DOCUMENTS

| | | |
|---|---|---|
| JP | 63-316486 | 12/1988 |

OTHER PUBLICATIONS

Kittl et al, "Design of TPV–Generator System," 25th Annual Proceedings Power Sources Conference, Session on Thermal Energy Conversion, May 1972.*

Höfler et al.; *Selective Emitters for Thermophotovoltaic Solar Energy Conversion*; Solar Cells, 1983; 10: pp. 257–271.

Höfler et al.; *Interference Filters for Thermophotovoltaic Solar Energy Conversion*; Solar Cells, 1983; 10: pp. 273–286.

Höfler et al.; *Selective Absorbers and Interference Filters for Thermophotovoltaic Energy Conversion*; Proceedings of 5th Photovoltaic Solar Energy Conf., Athens, Greece(Oct. 1983); pp. 225–229.

(List continued on next page.)

*Primary Examiner*—Alan Diamond
(74) *Attorney, Agent, or Firm*—James Creighton Wray; Meera P. Narasimhan (57) ABSTRACT

Our cylindrical TPV generator uses low bandgap PV cells mounted on circuits in a polygonal array around an IR emitter. The combustion gases are completely contained within the radiant tube burner. The PV array is mounted inside a leak-tight envelope cooled on its outer surface by either water or air flow. Flanges on either end of this PV array container allow for hermetic seals. A folded back coaxial emitter support tube provides a long path length limiting thermal conduction along its cylindrical wall from the very hot emitter section to the cooled seal flange. In our improved cylindrical TPV generator, we provide for a low temperature catalytic after-burn by providing a perforated turnaround plate coupling between the inner disk stack and the outer disk stack. This perforated turnaround plate provides a small amount of combustion air for the after-burn. A catalyst coating can be provided on the hotter surface of the outer finned disks. The after-burn occurs in the outer finned disk stack. Additional features are incorporated in our cylindrical TPV generator to provide for high conversion efficiency.

17 Claims, 7 Drawing Sheets

U.S. PATENT DOCUMENTS

| | | | |
|---|---|---|---|
| 4,906,178 | A | 3/1990 | Goldstein et al. |
| 4,976,606 | A | 12/1990 | Nelson |
| 5,044,939 | A | 9/1991 | Dehlsen |
| 5,080,724 | A | 1/1992 | Chubb |
| 5,091,018 | A | 2/1992 | Fraas et al. |
| 5,096,505 | A | 3/1992 | Fraas et al. |
| 5,118,361 | A | 6/1992 | Fraas et al. |
| 5,123,968 | A | 6/1992 | Fraas et al. |
| 5,217,539 | A | 6/1993 | Fraas et al. |
| 5,248,346 | A | 9/1993 | Fraas et al. |
| 5,255,666 | A | 10/1993 | Curchod |
| 5,312,521 | A | 5/1994 | Fraas et al. |
| 5,356,487 | A | 10/1994 | Goldstein et al. |
| 5,383,976 | A * | 1/1995 | Fraas et al. ............... 136/253 |
| 5,389,158 | A | 2/1995 | Fraas et al. |
| 5,401,329 | A * | 3/1995 | Fraas et al. ............... 136/253 |
| 5,403,405 | A | 4/1995 | Fraas et al. |
| 5,439,532 | A * | 8/1995 | Fraas ............... 136/253 |
| 5,505,789 | A | 4/1996 | Fraas et al. |
| 5,512,109 | A | 4/1996 | Fraas et al. |
| 5,551,992 | A * | 9/1996 | Fraas ............... 136/253 |
| 5,560,783 | A | 10/1996 | Hamlen |
| 5,601,661 | A | 2/1997 | Milstein et al. |
| 5,616,186 | A | 4/1997 | Fraas et al. |
| 5,651,838 | A | 7/1997 | Fraas et al. |
| 5,865,906 | A | 2/1999 | Ferguson et al. |
| 5,942,047 | A | 8/1999 | Fraas et al. |
| 6,037,536 | A | 3/2000 | Fraas |
| 6,091,018 | A | 7/2000 | Fraas et al. |
| 6,177,628 | B1 | 1/2001 | Fraas et al. |
| 6,198,038 | B1 * | 3/2001 | Shukla et al. ............... 136/253 |
| 6,218,607 | B1 | 4/2001 | Mulligan et al. |
| 6,232,545 | B1 | 5/2001 | Samaras et al. |
| 6,235,983 | B1 * | 5/2001 | Becker et al. ............... 136/253 |
| 6,271,461 | B1 | 8/2001 | Fraas et al. |

OTHER PUBLICATIONS

Morgan et al.; *Radioisotope Themal Photovoltaic Application of the GaSb Solar Cell*; Proceedings of NASA Sprat Conference (1989); pp. 349–358.

Day et al.; *Application of the GaSb Solar Cell in Isotope-heated Power Systems*; Conference Record, 21st IEEE Photovoltaic Specialists Conf. (May 1990); pp. 1320–1325.

Chubb; *Reappraisal of Solid Selective Emitters*; Conference Record, 21st IEEE Photovolatic Specialists Conf. (May 1992); pp. 1326–1333.

Fraas et al.; *Status of TPV Commercial System Development Using GaSb Infrared Sensitive Cells*; Presentation at Second World Photovoltaic Specialists Conference, Vienna, Austria; Jul. 6–10, 1998; Pre–print Copy: 5 pages.

Whitaker; *GaSb Shines Brighter Than The Midnight Sun*; Compound Semiconductor, Technology Update; Fall 1998; pp. 33–34.

* cited by examiner

FIG. 1

PRIOR ART

TPV CYLINDRICAL GENERATOR FOR HOME COGENERATION

BACKGROUND OF THE INVENTION

We have previously described a cylindrical ThermoPhotoVoltaic (TPV) generator in which combustion is used to heat a cylindrical tube to a temperature in the range of 1200 C. to 1500 C. This glowing tube then emits infrared radiant energy. An array of low bandgap photovoltaic (PV) cells surrounds this glowing emitter, receives the infrared radiant energy, and converts it to electricity. Our previously described cylindrical TPV generator was also equipped with a recuperator used to recycle heat from the combustion exhaust stream back into the combustion air for a higher efficiency TPV generator. We have noted that these cylindrical TPV generators can potentially be used to generate heat and power for the home with 90% fuel utilization efficiency.

In a separate more recent patent, we have described an AntiReflection coated Refractory Metal (AR/RM) IR emitter designed to emit infrared energy primarily in a wavelength band that the PV cells can convert. However, many of these AR/RM emitters cannot be operated in air because of oxidation of the refractory metal. In our specific TPV systems, we use GaSb PV cells that respond to IR wavelengths out to 1.8 microns and AR coated tungsten foil as the key emitter and receiver components. However in our previous patents, we have noted that various other material combinations are possible as long as they operate in this IR wavelength range.

There is a need to design a cylindrical TPV generator with a hermetic seal that allows the AR/RM emitter to operate in a non-oxidizing inert gas atmosphere. This hermetic seal design must minimize heat transfer from the very hot emitter support tube to the hermetic seal. Furthermore, for the home Combined Heat and Power (CHP) application, there is a need for a low NOx burner/recuperator combination. The recuperator design needs to be compact, inexpensive to fabricate, and integrated with the hermetic seal and low NOx requirements. Finally, the generator design needs to produce electricity with a conversion efficiency as high as possible.

SUMMARY OF THE INVENTION

Our cylindrical TPV generator uses low bandgap PV cells mounted on circuits in a polygonal array around an IR emitter. The IR emitter is located on the outside surface of a radiant tube burner coaxial with the PV array. The combustion gases are completely contained within the radiant tube burner. The PV array is mounted inside a leak-tight envelope cooled on its outer surface by either water or air flow. Flanges on either end of this PV array container allow for hermetic seals. The flange on one end of this PV container seals to a flange on the end of the emitter support tube. This seal allows the space between the emitter and the PV array to be back-filled with an inert gas. However in order to avoid overheating this seal, the emitter support tube is elongated extending into the recuperator section and then folded back exiting the recuperator with a slightly larger coaxial tube connecting to a flange sealing to the Photovoltaic Converter Array (PCA). This folded back coaxial emitter support tube provides a long path length limiting thermal conduction along its cylindrical wall from the very hot emitter section to the cooled seal flange.

The folded back emitter support tube blends nicely with a two stage folded back recuperator assembly consisting of two sets of finned disks. A stack of smaller finned disks is located inside the emitter support tube and a second stack of larger finned disks is located outside the fold back section. The dual disk stack design has several advantages. First, it is very compact being much shorter in length than a single disk stack. Second, it is more efficient than a single disk stack because the hottest section is inside cooler sections. In a single disk stack, the outer section is the hottest. The third advantage is somewhat subtle. This design allows for a low NOx burner/recuperator assembly.

It is desirable for a home TPV generator to operate with low NOx. However, high NOx can be a problem for a high temperature burner. A solution to this NOx problem is to burn the fuel at high temperature with no excess oxygen so that little NOx is generated. However, this fuel rich burn leaves CO and hydrocarbons. These can be eliminated in a low temperature after-burn with a catalyst. In our improved cylindrical TPV generator, we provide for a low temperature catalytic after-burn by providing a perforated turnaround plate coupling between the inner disk stack and the outer disk stack. This perforated turnaround plate provides a small amount of combustion air for the after-burn. A catalyst coating can be provided on the hotter surface of the outer finned disks. The after-burn occurs in the outer finned disk stack.

Additional features are incorporated in our cylindrical TPV generator to provide for high conversion efficiency. Mirrors are located at the ends of the PV array to confine the IR energy between the emitter and the array. Also, the inner burner tube within the emitter support tube can be tapered in order to optimize the emitter temperature profile along the length of the emitter. Both of these provisions provide for uniform illumination of the cells so that all of the cells in a series string generate approximately the same current.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
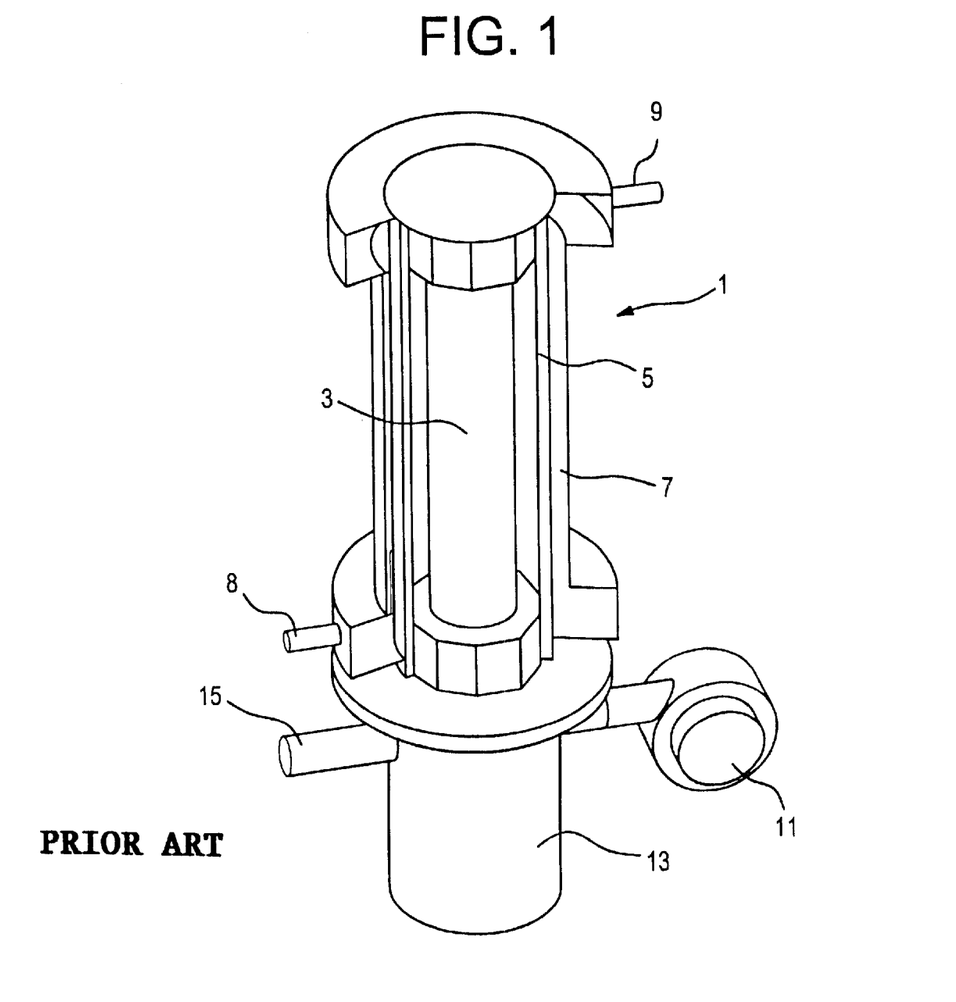
FIG. 1 shows the basic cylindrical TPV generator concept as described in our previous patents.

FIG. 1 shows the cylindrical TPV generator concept with the key components labeled. However, no detail is provided with regard to the key issues we address here. We begin by noting that the TPV conversion efficiency of this cylindrical generator 1 can be improved dramatically by using an AR/RM emitter 3. In a preferred embodiment, the AR/RM emitter can be an AR coated tungsten foil wrapped around an emitter support tube. However as we have pointed out above, provisions are then required for operating the AR/RM emitter in an inert gas background. A photovoltaic (PV) cell array 5 surrounds the emitter 3. A water cooling jacket 7 is provided outside the array 5. The jacket has an inlet 8 and an outlet 9. A combustion air blower 11 supplies combustion air through a recuperator 13. Hot combustion exhaust gases exit through exhaust 15. Provisions are also required for a low NOx efficient burner/recuperator assembly. Finally, provisions are required for high IR to electric conversion efficiency.

Figure 2:
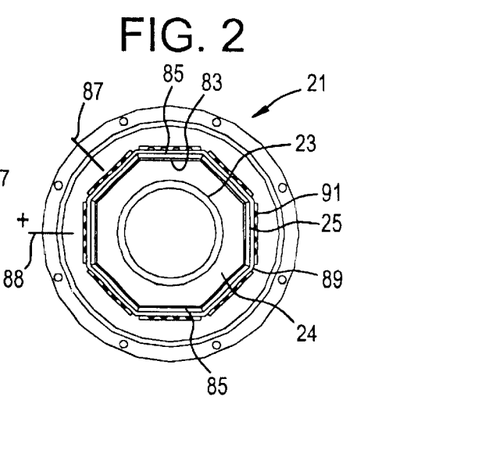
FIG. 2 shows a horizontal cross section through the TPV converter cylinder with the PV array and IR emitter locations indicated.
Figure 3:
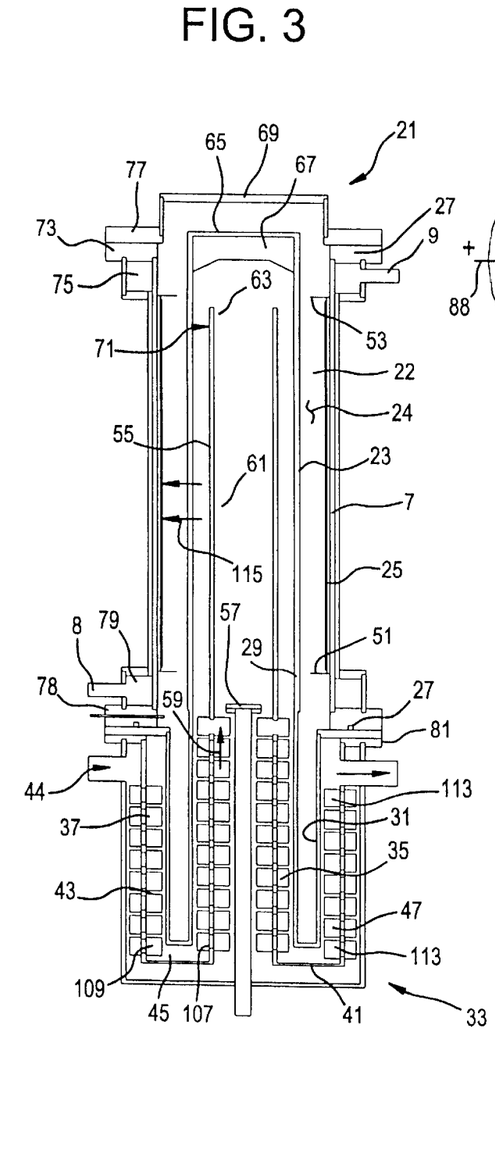
FIG. 3 shows a vertical cross section through our improved TPV generator concept with the improvements labeled in capital letters.

FIGS. 2 and 3 show horizontal and vertical cross sections through our improved cylindrical TPV generator 21. The IR emitter 23 in FIG. 2 is an AR/RM emitter. Given an AR/RM emitter, eight specific improvements are highlighted in capital letters in FIG. 3. These improvements are as follows:

1. Inert gas 24 between IR AR/RM emitter 23 and PV cell array 25.
2. Hermetic seal 27 between IR emitter support tube 31 and PV cell array 25.
3. Fold back coaxial emitter support tube 31 within recuperator 33.
4. Dual disk stack recuperator 33 with inner disk stack 35 and outerdisk stack 37.
5. Perforated turn around plate 41 for after-burn 43 air supply 45.
6. Catalytic coating 47 on outer disk stack 37 for clean after-burn.
7. End mirrors 51, 53 for IR confinement.
8. Tapered inner burner tube 55 to tailor emitter temperature uniformity.

As we will describe in the following paragraphs, several of these features are nicely integrated together in our improved generator design.

Our design starts with the fact that the AR/RM emitter 23 produces a major improvement in system efficiency because it suppresses long wavelength IR energy that the cells cannot convert. However, this leads to a requirement for inert gas 24 between the AR/RM emitter 23 and the PV array 25.

A burner 57 supplies fuel to preheated air 59. Combustion 61 occurs within the burner or combustion tube 55. Hot combustion gasses 63 flow upward and are turned downward by the top 65 with insulation 67 within cap 69. The upper end 71 of combustion tube 55 is spaced inward from the emitter 23 too, because of the higher heat at the upper end.

A flange 73 extends outward from the water gallery 75 at the outlet 9. Flange 73 is sealed to flange 77 of cap 69. Flange 78 at the inlet water gallery 79 is hermetically sealed 27 to the flange 81 between the emitter support tube 31 and the PV cell array 25.

Figure 4:
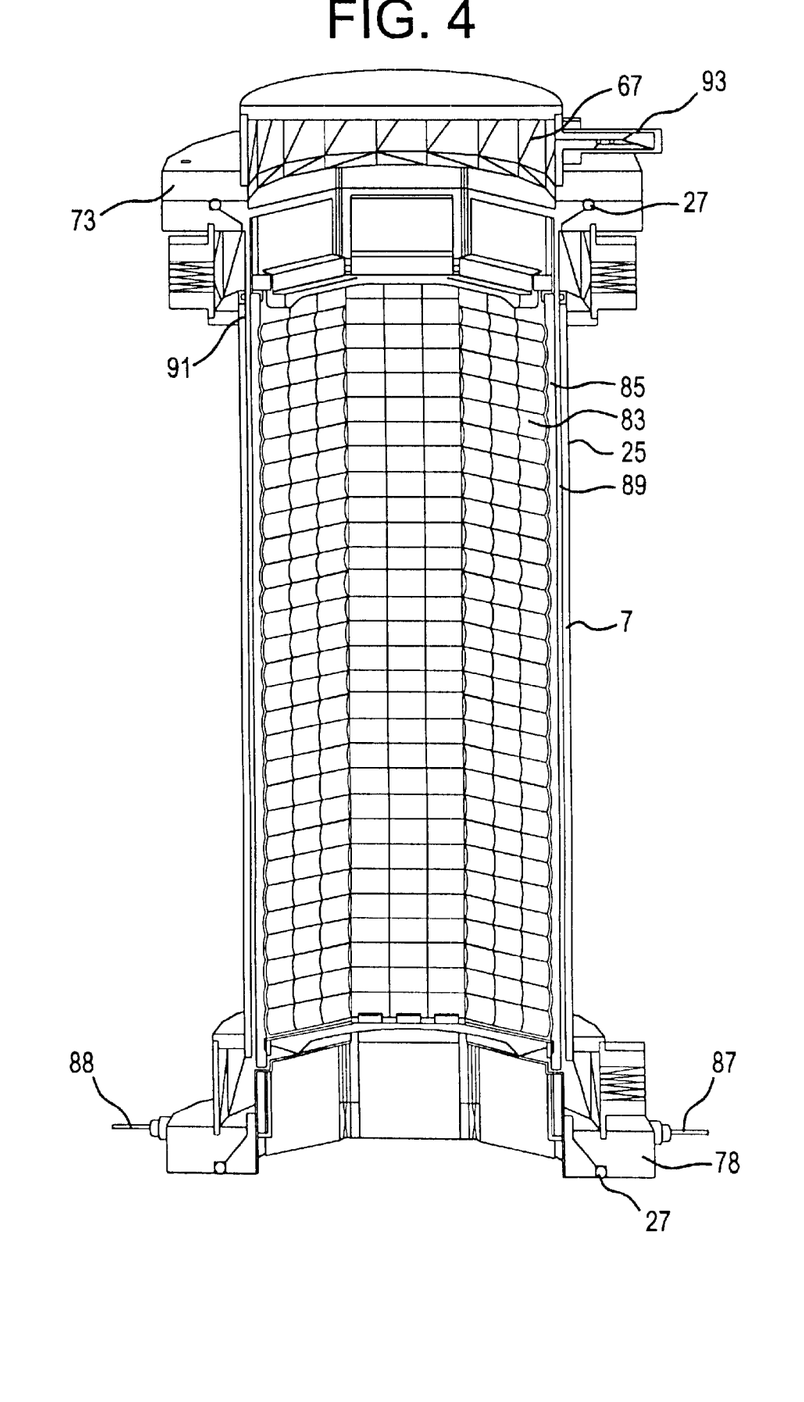
FIG. 4 shows an internal view of the PV cell and circuit array inside the leak tight envelope with hermetic seal flanges and external water-cooling.

Referring to FIGS. 2, 3, and 4 our cylindrical TPV generator 21 uses low bandgap PV cells 83 mounted on circuits 85 in a polygonal array around an IR emitter. The IR emitter is located on the outside surface of a radiant tube burner coaxial with the PV array. The combustion gases are completely contained within the radiant burner tube 29. The PV array is mounted inside a leak-tight envelope 89 cooled on its outer surface by water channels 91. Flanges 73, 78 on either end of this PV array container allow for hermetic seals 27. The flange 78 on one end of this PV container 89 seals to a flange 81 on the end of the emitter support tube 31. This seal allows the space 22 between the emitter and the PV array to be back-filled with an inert gas 24.

An internal view of the PV cell 83 and circuit 85 array inside the leak tight envelope 89 with hermetic seal flanges and external water-cooling 7 is shown in FIG. 4. FIG. 4 also shows the electrical connections 87, 88 to the circuits 85. Inert gas connection 93 supplies inert gas to space 22.

Figure 5:
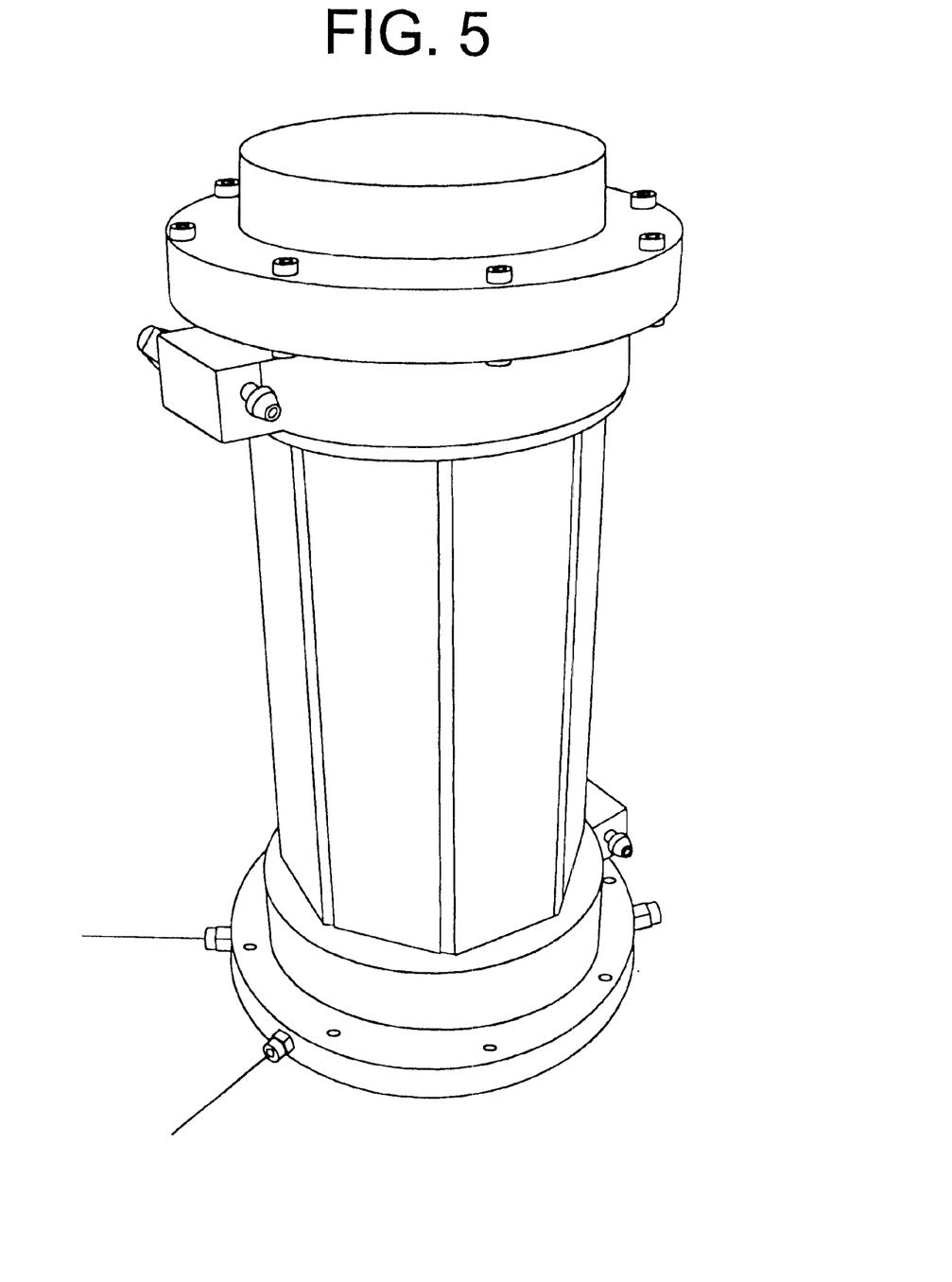
FIG. 5 shows a photograph of the photovoltaic converter array assembly.
Figure 6:
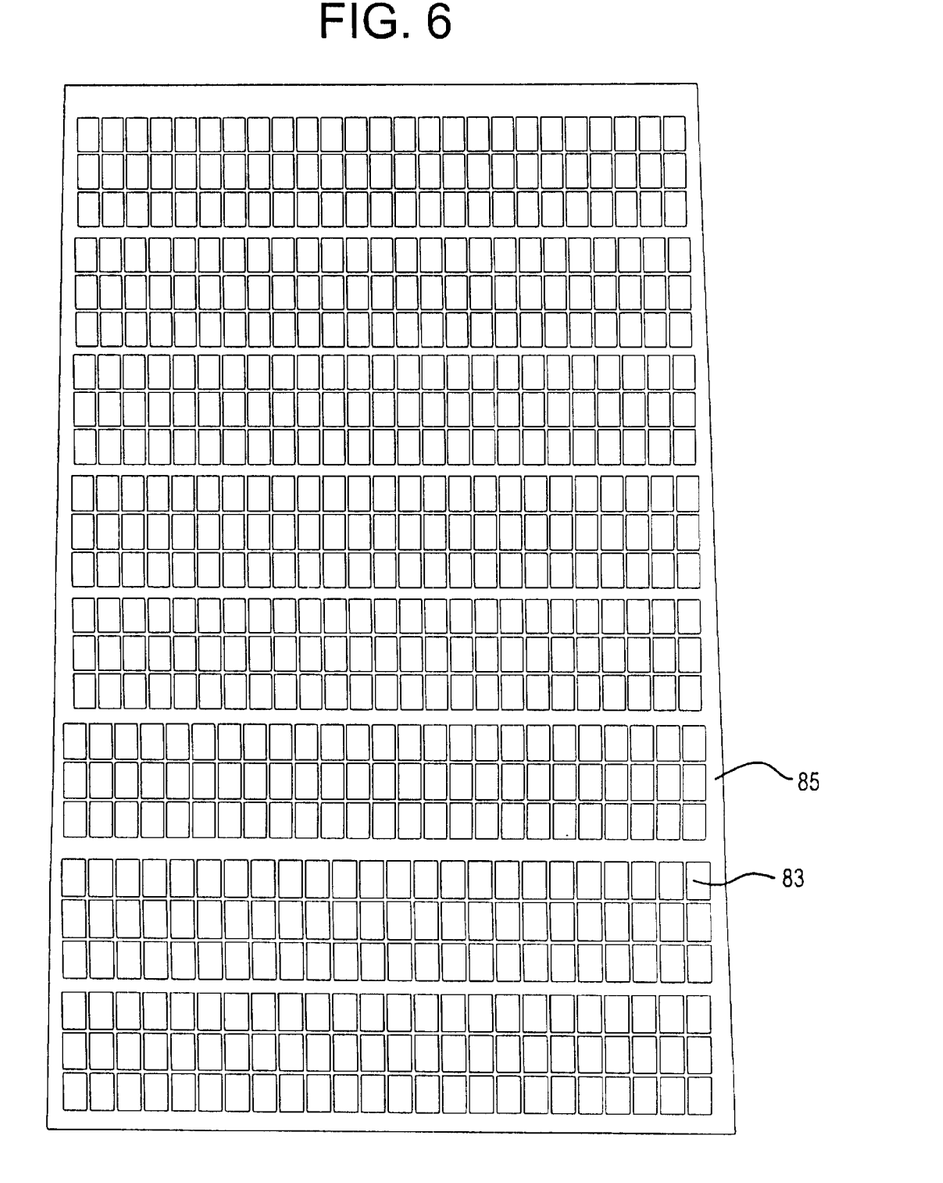
FIG. 6 shows a photograph of the shingle circuits with low bandgap cells before mounting inside the leak tight housing.

FIG. 5 shows a photograph of the photovoltaic converter array assembly enclosure 89. FIG. 6 shows a photograph of the shingle circuits 85 with low bandgap cells 83 before bonding and mounting inside the leak tight housing 89.

Returning to FIG. 3, note that the radiant burner tube 29 is elongated extending into the recuperator section 33 and then folded back exiting the recuperator with a slightly larger coaxial tube 31 connecting to a flange 81 sealing 27 to the flange 78 of the Photovoltaic Converter Array (PCA) 25. This avoids overheating the hermetic seal flange. This folded back coaxial emitter support tube 31 provides a long path length limiting thermal conduction along its cylindrical wall from the very hot emitter section 23 to the cooled seal flange.

Figure 7:
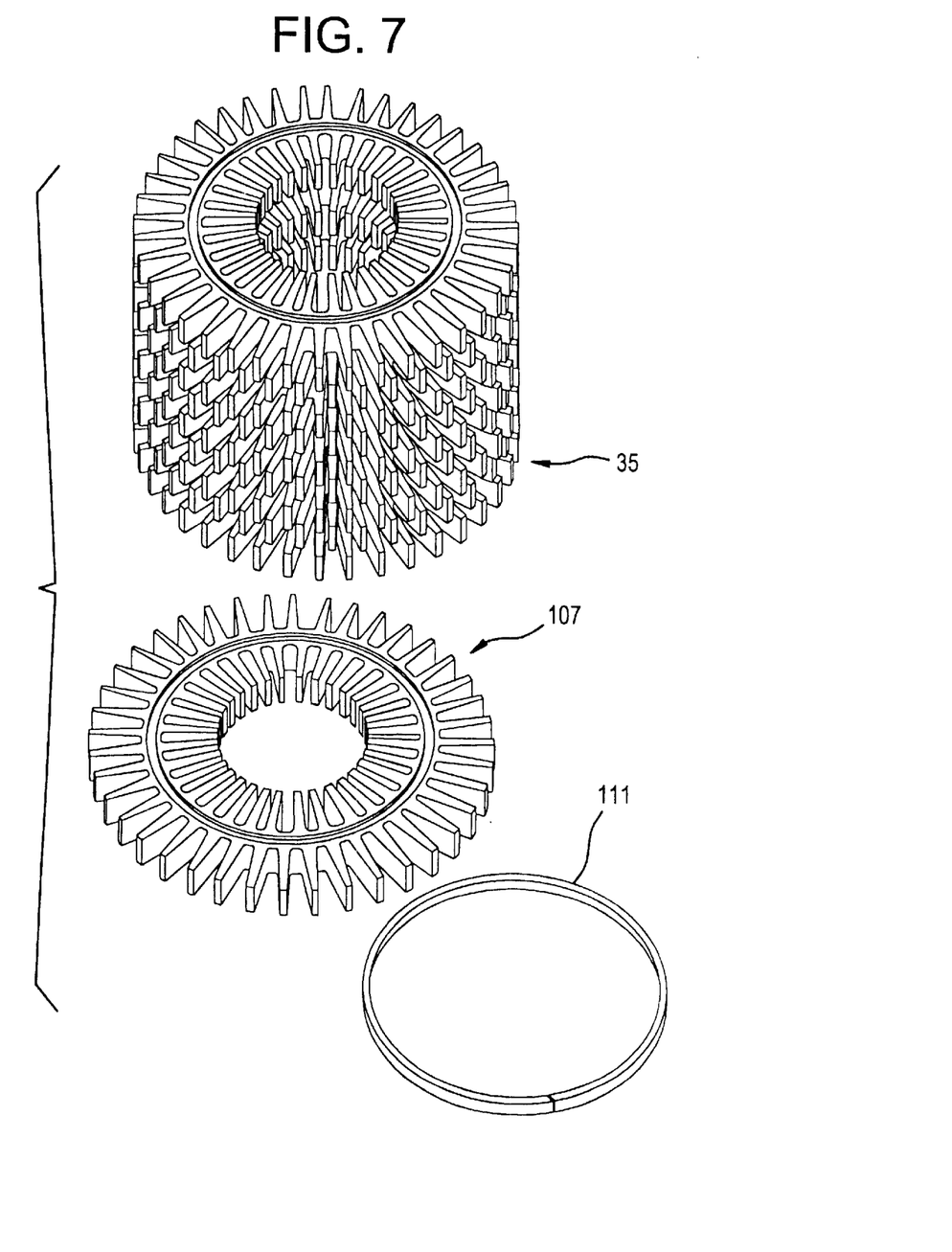
FIG. 7 shows a photograph of the inner finned disk recuperator stack.

The folded back emitter support tube 31 blends nicely with a two stage folded back recuperator assembly 33 consisting of two sets 35, 37 of finned disks 107, 109. A stack 35 of smaller finned disks 107 is located inside the radiant burner tube extension and a second stack 37 of larger finned disks 109 is located outside the fold back section 31. FIG. 7 shows a photograph of the inner disc stack 35. As can be seen from this photograph, this stack is made up of finned disks 107 and rings 111 simply pressed together to make the stack.

The dual disk stack design has several advantages. First, it is very compact being much shorter in length than a single disk stack. Second, it is more efficient than a single disk stack, because the hottest section 35 is inside cooler sections 37. In a single disk stack, the outer section is the hottest. The third advantage is somewhat subtle. This design allows for a low NOx burner/recuperator assembly.

It is desirable for a home TPV generator to operate with low NOx. However, high NOx can be a problem for a high temperature burner. A solution to this NOx problem is to burn the fuel at high temperature with no excess oxygen so that little NOx is generated. However, this fuel-rich burn leaves CO and hydrocarbons. These can be eliminated in a low temperature after-burn with a catalyst inside the recuperator section. In our improved cylindrical TPV generator as shown in FIG. 3, we provide for a low temperature catalytic after-burn by providing a perforated turnaround plate 41 coupling between the inner disk stack 35 and the outer disk stack 37. This perforated turnaround plate 41 provides a small amount 45 of combustion air 44 for the after-burn. A catalyst coating 47 can be provided on the hotter surface 113 of the outer finned disks 109. The after-burn occurs in the outer finned disk stack 37.

Referring again to FIG. 3, additional features are incorporated in our cylindrical TPV generator to provide for high conversion efficiency. Mirrors 51, 53 are located at the ends of the PV array 25 to confine the IR energy 115 between the emitter 23 and the array 25. Also, the inner burner tube 55 within the radiant burner tube 29 can be tapered in order to optimize the emitter temperature profile along the length of the emitter. Both of these provisions provide for uniform illumination of the cells 83 so that all of the cells in a series string along a circuit 85 generate approximately the same current.

Figure 8:
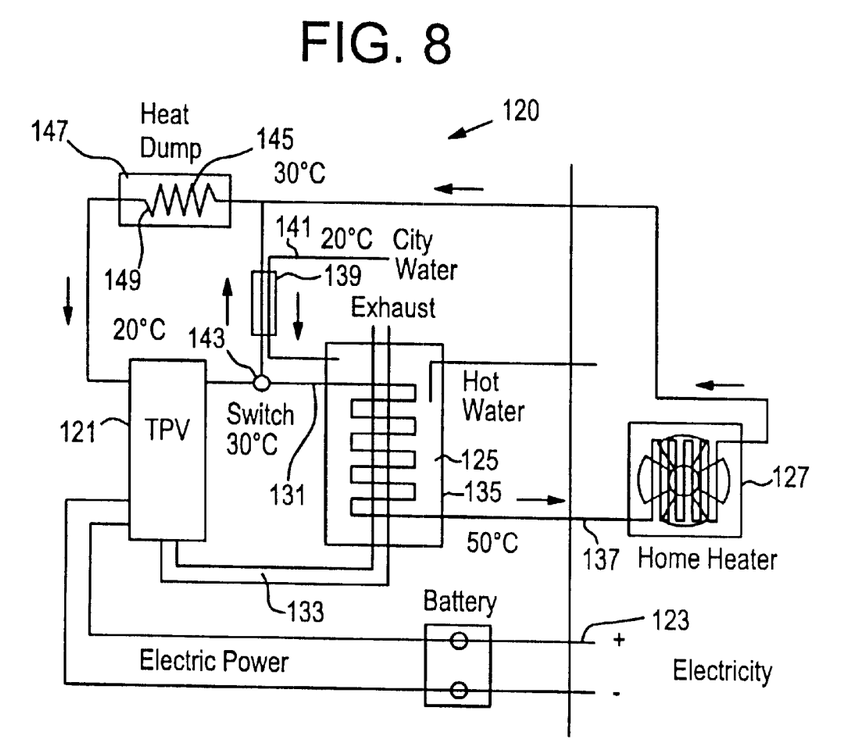
FIG. 8 shows one way of integrating the TPV generator into a home for the cogeneration of electricity, hot water, and space heating (CHP).

Our cylindrical TPV generator design can be built in sizes ranging from 300 W to 3 kW. One of its intended applications is for use in the home to replace the conventional heating furnace. FIG. 8 shows one way of integrating our TPV generator 121 into a home 120 for the cogeneration of electricity 123, hot water 125, and space heating (CHP) 127.

As can be seen in FIG. 8, the PCA water-cooling loop 131 can be used for space heating 127, and the higher temperature exhaust heat 133 can be used for hot water 125. It is best to describe the arrangement in FIG. 8 under three alternative scenarios. These three scenarios are winter, summer, and back up electric power.

In the winter months, electricity 123, space heating 127, and hot water 125 are all required. In this case, the TPV generator 121 runs producing electricity and heat most of the time. The heat produced is in the form of exhaust heat 133 and heat in the cell-cooling loop 131. These two heat inputs are both dumped through the hot water tank 135 and thence 137 into the house for space heating 127. The fuel chemical-energy utilization efficiency can be as high as 90%. The generator 121 runs much of the time because both space heat and hot water are required.

In the summer time when only hot water is required, the heat injected into the cell cooling water 131 can be used to preheat 139 the cold city water 141. In this case, the heat in the cell-cooling loop 131 bypasses the hot water tank using a switching valve 143. The exhaust heat 133 is used to bring the hot water 125 to its final required temperature. It is assumed that heat input is required primarily to heat the re-supply city water when hot water is being used in the house. Again in this case, the fuel chemical-energy utilization efficiency can be as high as 90%. However, the TPV generator is only used when hot water is being used which, during the summer months, is only a small fraction of the time.

The last case to consider is when electricity is required but there is no need for heat. In this case, the fuel chemical-energy utilization efficiency for generating electricity would be approximately 10%. The heat in the cell-cooling loop 131 would again bypass the hot water tank using a switching valve 143. The waste heat would be dumped 145 into the ground 147 through underground piping 149 before the cooling water returns back to the PCA in the generator 121. This last case would probably be a very small fraction of the time. An example where this case would be appropriate is when the utility power fails and backup power is required.

While the invention has been described with reference to specific embodiments, modifications and variations of the invention may be constructed without departing from the scope of the invention, which is defined in the following claims.

We claim:

1. A thermophotovoltaic generator comprising a burner, a combustion air guide leading to the burner, a burner or combustion tube extending upwards around the burner, an infrared emitter spaced outward from the burner tube, a photovoltaic cell array spaced outward from the emitter, an exhaust guide connected to the generator for exhausting combustion gasses, a recuperator connected to the combustion air guide and to the exhaust guide for preheating combustion air with exhaust gasses, the recuperator having fins extending into the combustion air guide and into the exhaust guide, the recuperator further comprising dual disk recuperator stacks, a fold-back emitter support tube extending between the dual disk recuperator stacks, a perforated turn around plate separating the combustion air guide from the exhaust guide for leaking the combustion air into the exhaust guide, catalyst coatings on at least some of the fins extending into the exhaust guide and cooperating with leaked combustion air for completing combustion of the exhaust gasses.

2. The generator of claim 1, further comprising inert gas disposed between the emitter and the photovoltaic cell array.

3. The generator of claim 2, further comprising a hermetic seal between the support tube and the array for sealing the inert gas between the support tube and the array.

4. The generator of claim 1, further comprising end mirrors at opposite ends of the array for reflecting infrared rays toward the array.

5. The generator of claim 1, wherein the burner tube comprises a tapered burner tube for controlling spacing between the tapered burner tube and the emitter.

6. The generator of claim 1, wherein the dual disk recuperator stacks are formed of an inner stack and an outer stack.

7. The generator of claim 6, wherein each stack is formed of disks having inward and outward extending fins and rings interconnecting the disks.

8. A thermophotovoltaic generator comprising a burner, a combustion air guide leading to the burner, a burner tube extending from the around the burner, an infrared emitter spaced outward from the burner tube, a photovoltaic cell array spaced outward from and surrounding the emitter, an exhaust guide connected to the generator for exhausting combustion gasses, and end mirrors at opposite ends of the array for reflecting infrared rays toward the array.

9. The generator of claim 8, wherein the burner tube comprises a tapered burner tube for controlling spacing between the tapered burner tube and the emitter.

10. A thermophotovoltaic generator comprising a burner, a combustion air guide leading to the burner, a burner tube extending from the around the burner, an infrared emitter spaced outward from the burner tube, a photovoltaic cell array spaced outward from the emitter, an exhaust guide connected to the generator for exhausting combustion gasses, a fold back emitter support tube having an inner portion connected to the emitter having a middle portion extending away from the emitter then outward and then in the direction of the emitter and then outward for connecting to an enclosure for reducing conduction heat flow from the emitter along the emitter support tube to the enclosure.

11. The generator of claim 10, further comprising inert gas disposed between the emitter and the photovoltaic cell array.

12. The generator of claim 11, further comprising a hermetic seal between the support tube and the array for sealing the inert gas between the support tube and the array.

13. The generator of claim 10, further comprising end mirrors at opposite ends of the array for reflecting infrared rays toward the array.

14. The generator of claim 10, wherein the burner tube comprises a tapered burner tube for controlling spacing between the tapered burner tube and the emitter.

15. The generator of claim 10, further comprising a dual disk recuperator having an inner stack positioned inside the middle portion and having an outer stack positioned outside the middle portion.

16. The generator of claim 15, further comprising a recuperator turnaround plate, wherein the middle portion of the emitter support tube and the recuperator turnaround plate form the exhaust guide and further comprising a porous portion of the recuperator turnaround plate for leaking combustion air into the exhaust guide.

17. The generator of claim 16, further comprising catalyst coatings on at least some exhaust fins extending into the exhaust guide and cooperating with leaked combustion air for completing combustion of the exhaust gasses.

* * * * *